(12) United States Patent
Benayoun et al.

(10) Patent No.: US 6,805,912 B2
(45) Date of Patent: Oct. 19, 2004

(54) PROCESS AND DEVICE FOR COATING A SUPPORT USING A CROSSLINKABLE SILICONE COMPOSITION

(76) Inventors: Jean-Paul Benayoun, 82, rue Racine, F-69100 Villeurbanne (FR); Christophe Guyot, 6, Impasse du Point du Jour, F-69005 Lyon (FR); André Lievre, 75, rue de Vouries, F-69230 Saint-Genis-Laval (FR); Christian Mirou, 5, Avenue Barthelemy Buyer, F-69005 Lyon (FR); François Desne, 84, rue du Pensionnat, F-69003 Lyon (FR); Bernard Mirabel, 60, rue Duguesclin, F-69006 Lyon (FR); Alain Pouchelon, 2, rue G. Courtelle, F-69330 Meyzieu (FR)

( * ) Notice: Subject to any disclaimer, the term of this patent is extended or adjusted under 35 U.S.C. 154(b) by 214 days.

(21) Appl. No.: 09/952,162

(22) Filed: Sep. 14, 2001

(65) Prior Publication Data
US 2002/0114891 A1 Aug. 22, 2002

Related U.S. Application Data

(63) Continuation-in-part of application No. 09/273,799, filed on Mar. 19, 1999, now Pat. No. 6,395,338, which is a continuation-in-part of application No. 09/230,339, filed on Feb. 2, 1999, now Pat. No. 6,387,452.

(51) Int. Cl.$^7$ ............................. B05D 5/08; B05D 1/40
(52) U.S. Cl. ...................... 427/358; 427/356; 427/387; 427/389.9; 427/391; 427/397.7; 427/428
(58) Field of Search ............................. 427/387, 389.9, 427/391, 397.7, 388.2, 428, 356, 358

(56) References Cited

U.S. PATENT DOCUMENTS

| | | | | |
|---|---|---|---|---|
| 4,745,011 A | * | 5/1988 | Fukuta et al. | 427/426 |
| 5,051,311 A | * | 9/1991 | Popa et al. | 428/447 |
| 5,629,387 A | * | 5/1997 | Frances et al. | 525/478 |
| 5,783,311 A | * | 7/1998 | Lorenzetti et al. | 428/447 |
| 5,998,536 A | * | 12/1999 | Bertry et al. | 524/557 |
| 6,387,452 B1 | * | 5/2002 | Benayoun et al. | 427/387 |
| 6,395,338 B1 | * | 5/2002 | Benayoun et al. | 427/387 |

FOREIGN PATENT DOCUMENTS

FR    2704553 A2   * 11/1994

* cited by examiner

Primary Examiner—Kristen C. Jolley

(57) ABSTRACT

Process for the continuous coating of a strip of paper or of a textile support using a silicone composition, comprising at least one POS A containing SiVi or SiOR groups, a POS B containing SiH groups and a catalyst C (for hydrosilylation or for dehydrogeno-condensation) and not corresponding to an LTC/FC silicone system, the said process comprising the following steps: step 1 in which conditions for homogeneously mixing the constituents A, B and C are used such that the homogeneity obtained is reflected by a DSC signature comprising a Gaussian peak for which the peak end temperature T3 is in the range from a value above 110° C. to 200° C., the said conditions making use of means for very precisely metering the constituents, means for premixing the constituents other than C and means for homogeneously mixing C with the premix(es) prepared; step 2 of conveying the homogeneous mixture to the coating site; step 3 of coating the support with the homogeneous mixture; and step 4 of crosslinking, in particular with thermal means.

14 Claims, 2 Drawing Sheets

PROCESS AND DEVICE FOR COATING A SUPPORT USING A CROSSLINKABLE SILICONE COMPOSITION

The present patent application is a continuation-in-part of the patent application of Ser. No. 09/273,799 filed on Mar. 19, 1999, now U.S. Pat. No. 6,395,338 commonly owned, which is a continuation-in-part of the patent application of Ser. No. 09/230,339 filed on the Feb. 2, 1999, now U.S. Pat. No. 6,387,452 commonly owned.

TECHNICAL FIELD OF THE INVENTION

The field of patent application Ser. No. 09/230,339, commonly owned, is that of silicone compositions which are crosslinkable by activation, which can be used in particular to form an anti-adhesive coating or film for a fibrous or non-fibrous support, for example a support made of paper or the like, or alternatively made of natural or synthetic polymer.

More specifically, the invention relates, in the first of these aspects, to a process for the continuous coating of a travelling support strip (e.g. paper, fabric, polymer), in order to give it anti-adhesion properties, the said coating being carried out using a silicone composition based on polyorganosiloxane (POS).

The anti-adhesive POSs which are of interest in the context of the invention taken in its first aspect are of the type which are crosslinkable rapidly ("fast cure") and at low temperature (low-temperature cure), by hydrosilylation or by dehydrogenopolycondensation, thermally or by a combination of heat and radiation (UV radiation or an electron beam). Such low-temperature cure and fast cure silicone compositions will be defined by the name: LTC/FC silicone systems.

The invention also relates to the device involved in the continuous coating process.

The anti-adhesive silicone compositions concerned comprise at least one POS A, a crosslinking agent B which is a POS and a catalyst. These ternary compositions can only exist transiently in non-crosslinked form. The reason for this is that, irrespective of the crosslinking mechanism concerned: hydrosilylation or dehydrogenopolycondensation, POSs of SiH type placed in the presence, in the first case, of POSs of SiVi type and of platinum hydrosilylation catalyst, or placed in the presence, in the second case, of POSs of SiOH or SiOR type and of platinum or tin condensation catalyst crosslink relatively quickly. The kinetics of crosslinking depends in particular on the reaction temperature.

These silicone systems are also characterized by bath lifetimes BLTs. The term BLT denotes the time required to double the dynamic viscosity measured at 30° C. The dynamic viscosity can be measured using a Brookfield viscometer according to the indications of AFNOR standard NFT 76102 of May 1982.

For the anti-adhesion treatments of supports (paper, fabric or polymer film), which consist in coating the surface of these supports with the abovementioned silicone compositions, it is imperative to apply and spread the said compositions when they are in non-crosslinked liquid form and thus entirely suited for use in the said operations.

Once the supports are coated with silicone composition, they are subjected to heating so as to accelerate their crosslinking.

The problematics underlying the invention, taken in its first aspect, described and claimed in the patent application of Ser. No. 09/230,339, commonly owned, now U.S. Pat. No. 6,387,452 is the provision of an anti-adhesive silicone coating process which:

1) offers a compromise between the parameters of reactivity; crosslinking temperature; crosslinking kinetics; and bath lifetime; and 2) involves a procedure for accurate metering and the preparation of a homogeneous mixture of the ingredients of the silicone composition, by using suitable means and by opting to vary operating parameters which are carefully selected.

With respect to point 1): as regards the crosslinking temperature, it is desirable to be able to allow low temperatures (which can be less than or equal to 110° C.), thus allowing the coating to be spread and crosslinked on heat-sensitive supports such as, for example, polyethylene, polypropylene, PVC and (to a lesser extent) polyethylene glycol terephthalate; as regards the crosslinking kinetics, it is also desirable to have available a process in which the silicone composition may be crosslinked, even at low temperature, according to high crosslinking kinetics so as to achieve gains in production efficiency and viability; and, as regards the BLT parameter, it is also desirable to have available a process which allows a reduction in the crosslinking temperature, while at the same time retaining bath lifetimes, for the non-crosslinked liquid silicone composition, which are of an acceptable level to allow industrial users a sufficient margin for carrying out the silicone coating at the required industrial rate and scale.

With respect to point 2), the carefully selected operating parameters are:

the bath lifetime, which is controlled by varying the nature and/or proportions of the components A, B and C and/or of their possible premixes, the homogeneity of the mixture, which is controlled via the DSC signature, allowing calibration relative to a reference mixture, and the flow rate of production of homogeneous mixture, which is adjusted to the rate of consumption with or without formation of a coating buffer tank, the mixture thus metered and homogenized being conveyed directly to the coating head of the machine, such that only the amount of mixture required to feed the coating head is prepared.

Thus, the invention according to the patent application of Ser. No. 09/230,339, commonly owned, taken in its first aspect, relates more specifically to a process for the continuous coating of a travelling support strip in order to give it anti-adhesion properties, the said coating being carried out using a silicone composition comprising: at least one polyorganosiloxane A, at least one crosslinking agent B which can be crosslinked by hydrosilylation and/or by dehydrogenopolycondensation, and an effective amount of catalyst C, characterized in that it consists, essentially:

1. in continuously mixing in measured amounts, in particular, the POS(s) A bearing reactive groups RGa, the crosslinking agent(s) B bearing reactive groups RGb, and the catalyst C; by:
  optionally preparing at least one premix AB and/or AC and/or BC when this premix can be prepared,
  selecting mixing conditions such that:
   the bath lifetime (BLT) is less than 10 h,
   the bath homogeneity is such that its differential scanning calorimetry DSC signature comprises at least one essentially Gaussian peak showing, a peak start temperature T1,
a peak summit temperature T2,
a peak end temperature T3,
this peak being characterized by:
-i- $T3 \leq 110°$ C.,
-ii- $\Delta T = T3 - T1 \leq 30°$ C., T3 possibly not being able to satisfy the parameter -i- above, and
-iii- $\Delta T = \Delta T\,ref \pm 10°$ C., $\Delta T$ ref corresponding to T3ref-T1ref, obtained from the DSC signature peak of a reference ABC mixture prepared according to the procedure Pr defined below in the present specification,
the flow rate of production of the homogeneous mixture is between a value corresponding to the rate of consumption of the mixture on the coating site(s) and a value which determines the constitution of a buffer tank, this flow rate value being such that the duration separating the time at which the components A, B and C are placed together and the time of application of the composition ABC to the travelling support strip is less than or equal to the BLT, 2. in conveying, simultaneously or otherwise, the composition directly from the mixer to the coating site(s),
3. in coating the travelling support strip with the composition,
4. in allowing the crosslinking to take place.

The DSC (Differential Scanning Calorimetry) analysis is carried out, in a manner which is known per se, using a Metler TA 4000 type machine with the following operating parameters: rate of temperature increase: 10.0° C./min; mass of the test sample: 15 mg; working in an open aluminium crucible.

The inventors have, to their credit, developed a continuous coating method which makes it possible industrially to use thermal silicone systems which crosslink (polyaddition or dehydrogeno-polycondensation) at low temperatures and with BLTs as short as values of less than 10 hours.

This innovation requires both expertise in silicone chemistry and, on the one hand, mastery of techniques for precise metering in ratios which can be as low as 1:100 or less than 1:100, and, on the other hand, for continuous intimate mixing of more or less viscous products which can be used at low flow rate. Given the precision of the meterings, which can be of the order of 1%, this results in a considerable improvement in the quality of the silicone coating, as well as excellent consistency of the production of quality finished products by the users.

Advantageously, the procedure Pr for establishing the reference mixture ABC in order to arrive at the comparative parameter $\Delta$Tref for the BLT peaks of the mixture consists in mixing the same constituents A, B and C in the same proportions in order to prepare, in a container, a mixture of 250 cm³, with moderate stirring using an impeller rotating at 1000 rpm for at least 15 min, at room temperature (25° C.).

In practice, if need be, the buffer tank can be established on the member for coating the travelling support strip. This tank is, for example, between 10 and 30 min of consumption of the composition used to carry out the coating.

It is also stated in the patent application of Ser. No. 09/230,339, commonly owned, now U.S. Pat. No. 6,387,452 that, when the homogeneity of the mixture ABC is such that it is reflected by a DSC peak for which the parameters (i), (ii) and (iii) are cumulatively satisfied, the invention described and claimed therein then relates to "an LTC/FC silicone system, given that such systems, although preferred in accordance with the invention, do not, however, exclude other silicone systems which crosslink at higher temperature and/or slightly less quickly".

It thus emerges that the invention in question also has a second aspect which consists of a process for the continuous coating of a travelling support strip, carried out using a silicone composition in which the POSs of interest are now, in particular, those which can be crosslinked between themselves at a higher temperature and/or slightly less quickly than the POSs of the LTC/FC silicone systems.

AIM OF THE PRESENT INVENTION

The present invention attempts to satisfy the following objects.

The first of these objects is to provide a continuous coating process carried out using a silicone composition which does not correspond to an LTC/FC silicone system, and which continues to combine, as explained in the patent application of Ser. No. 09/230,339, commonly owned, U.S. Pat. No. 6,387,452 on the one hand, an accurate metering procedure (using metering means, in particular volumetric means, which are capable of supplying a metered amount of each of the constituents of the silicone composition) and, on the other hand, a procedure for the homogeneous mixing of the constituents of the silicone composition (using homogeneous mixing means and premixing means, these means being of dynamic and/or static nature), with the aim of retaining the advantages mentioned above, in particular the considerable improvement in the quality of the silicone coating, as well as excellent consistency of the production of quality finished products.

The first object to be achieved comprises the development of a continuous coating process which has the abovementioned specifications and which can be used advantageously to coat a travelling flexible support strip consisting of papers of various types (supercalendered, laminated, etc.), cardboards, cellulose sheets, metal sheets, plastic (polyester, polyethylene, polypropylene, etc.) films, in order to give it anti-adhesive properties.

The first object to be achieved also comprises the development of a continuous coating process which has the abovementioned specifications and which can be used advantageously to coat a travelling flexible support strip consisting of a textile material such as, for example, fibrous, woven, knitted or non-woven supports, in order to give it properties, in particular, of mechanical protection and/or strength, the said coating being carried out using a silicone polyaddition composition which has the particular feature of belonging to the group of silicone elastomer polyaddition compositions for coating.

The second essential object, which the invention attempts to satisfy, is to provide a device which can be used in particular for carrying out the process of continuous coating of a textile material using a silicone elastomer polyaddition composition.

DESCRIPTION OF THE PRESENT INVENTION

Section (I)

Figure 1:
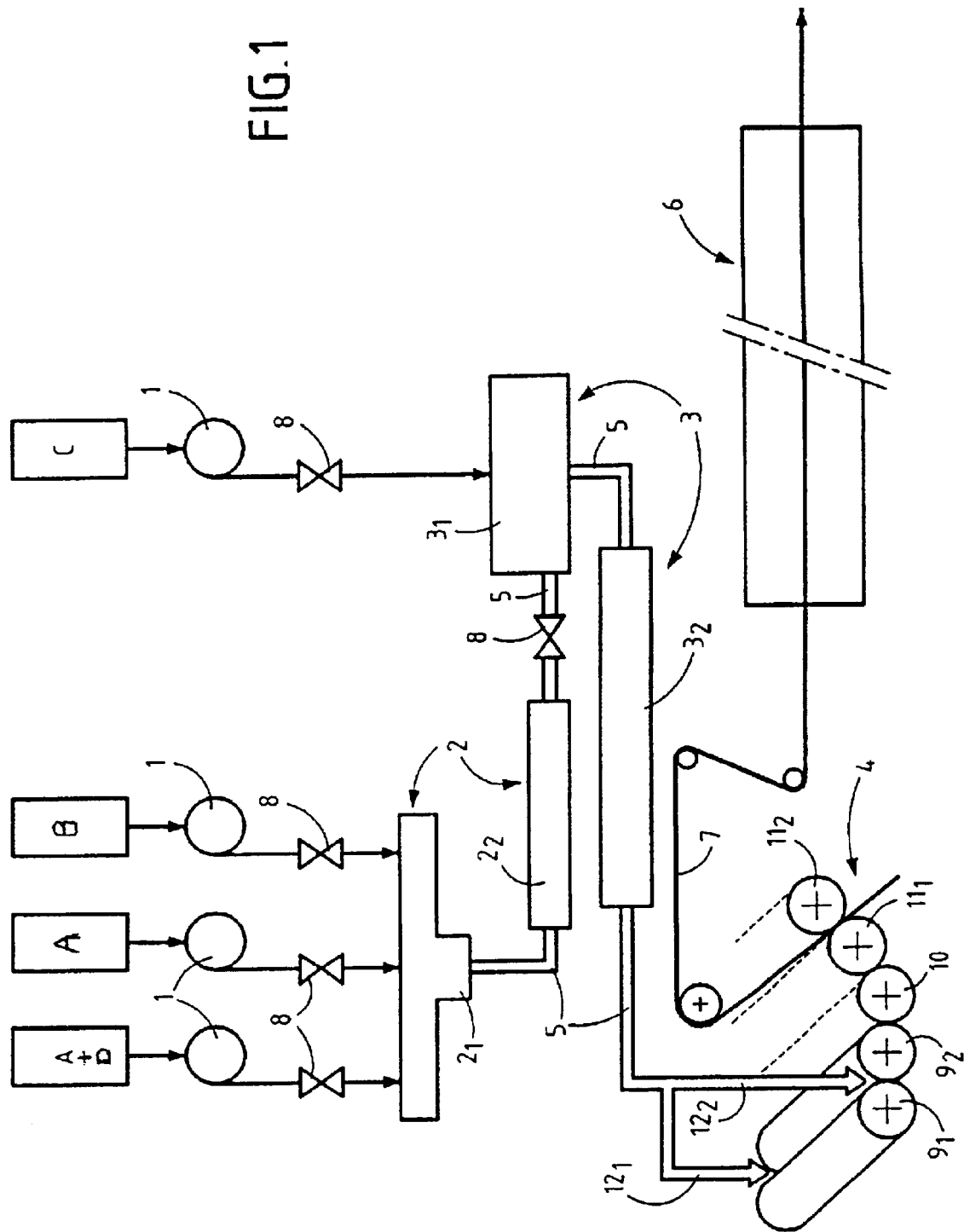
FIG. 1 is a drawing of an embodiment of a device useful in the process of the present invention.

Thus, the present invention satisfies the abovementioned objects, inter alia, by proposing, in a first subject, a process for the continuous coating of a travelling flexible support strip, this process offering a considerable improvement in the quality of the coating as well as excellent consistency of the production of finished products of the required quality, the said coating being carried out using a silicone composition comprising: at least one polyorganosiloxane A, at least one crosslinking agent B which can be crosslinked by hydrosilylation and/or by dehydrogenopolycondensation, and an effective amount of catalyst C, characterized in that it consists, essentially:

1. in continuously mixing in measured amounts, in particular, the POS(s) A bearing reactive groups RGa, the crosslinking agent(s) B bearing reactive groups RGb, and the catalyst C to form a homogeneous mixture; by:

preparing at least one premix AB and/or AC and/or BC when this premix can be prepared and/or by using a premix AB, selecting mixing conditions such that:

the bath lifetime (BLT) at 30° C. is in the range from 1 h to 24 h and preferably from 2 h to 22 h, the bath homogeneity is such that its differential scanning calorimetry DSC signature comprises at least one essentially Gaussian peak showing, a peak start temperature T1, a peak summit temperature T2, a peak end temperature T3, this peak being characterized by:

-i- T3 is in the range from a value above 110° C. to 200° C., and preferably from 112° C. to 150° C., -ii- $\Delta T = T3-T1$ is in the range from 20° C. to 100° C. and preferably from 20° C. to 80° C., -iii- $T1 \leq 100°$ C. and preferably $\leq 95°$ C., -iv- $\Delta T = \Delta T$ ref$\pm 10°$ C. and preferably $\Delta T$ ref$\pm 8°$ C., and even more preferably $\Delta T$ ref$\pm 4°$ C., $\Delta T$ ref corresponding to T3ref–T1ref, obtained from the DSC signature peak of a reference mixture ABC prepared according to the procedure Pr defined below in the present specification, the flow rate of production of the homogeneous mixture being such that the duration d separating the placing together, in particular, of the constituents A, B and C, and the time of application of the homogeneous base mixture, in particular of ABC, on the travelling support strip, is less than or equal to the BLT, this flow rate value possibly being between a value corresponding to the rate of consumption of the mixture on the coating site(s) and a value which determines the constitution of a buffer tank, 2. in conveying, simultaneously or otherwise, the composition in the form of a homogeneous mixture directly from the mixer to the coating site(s), 3. in coating the travelling support strip with the composition, 4. in allowing the crosslinking to take place.

The DSC (Differential Scanning Calorimetry) analysis is carried out, in a manner which is known per se, using a Metler TA 4000 type machine with the following operating parameters: rate of temperature increase: 10.0° C./min; mass of the test sample: 15 mg; working in an open aluminium crucible.

Advantageously, the procedure Pr for establishing the reference mixture ABC in order to arrive at the comparative parameter $\Delta T$ref for the DSC peaks of the mixture consists in mixing the same constituents A, B and C in the same proportions in order to prepare, in a container, a mixture of 250 cm$^3$, with moderate stirring using an impeller rotating at 1000 rpm for at least 15 min, at room temperature (25° C.).

In practice, if need be, the buffer tank can, here also, advantageously be established on the member for coating the travelling support strip.

The rate of coating consumption depends on the travelling speed of the support strip, the width and nature of this strip (absorbing power) and on the viscosity of the crosslinkable silicone composition and the size of the desired deposit (g/m$^2$).

In carrying out the coating, the dynamic viscosity at 25° C. of the homogeneous mixture can vary within a wide range, for example from 10 mPa.s and preferably from 100 mPa.s to 200,000 mPa.s or even more in the case of silicone elastomer polyaddition compositions.

Without this being limiting:

the POS A is selected from the group comprising:

POSs which contain, per molecule, at least two groups RGa, located in the chain and/or at the chain end(s), each consisting of a $C_2$–$C_{10}$ alkenyl group linked to the silicon, preferably a vinyl group, and mixtures thereof, while the crosslinking agent B consists of at least one POS containing, per molecule, at least two and preferably at least three groups RGb, each consisting of a hydrogen atom linked to the silicon, located in the chain and/or at the chain end(s);

A reacting with B by hydrosilylation.

For such compounds A and B, it has been possible to demonstrate that the molar ratio RGb:RGa advantageously needs to be within the range from 0.4 to 10, preferably 1 to 5 and even more preferably 1.1 to 3.

This relates to the context in which a person skilled in the art is capable of finding molar ratios which are suitable for satisfying the operating parameters of the invention, as defined above, and of applying them to the case of compounds A and B which can be crosslinked by hydrosilylation.

Examples of POSs A are (dimethyl)polysiloxanes containing dimethylvinylsilyl ends, (methylvinyl)polysiloxanes containing dimethylvinylsilyl ends, (methylvinyl)(dimethyl) polysiloxane copolymers containing trimethylsilyl ends, (methylvinyl)(dimethyl)polysiloxane copolymers containing dimethylvinylsilyl ends and cyclic (methylvinyl) polysiloxanes.

Examples of crosslinking agent B are (dimethyl) polysiloxanes containing dimethylhydrogenosilyl ends, (methylhydrogeno)polysiloxanes containing trimethylsilyl ends, (dimethyl)(methylhydrogeno)polysiloxane copolymers containing trimethylsilyl ends, cyclic (methylhydrogeno)polysiloxanes, resins M'Q consisting of $(CH_3)_2HSiO_{1/2}$ and $SiO_2$ units, and resins comprising $(CH_3) HSiO_{2/2}$ units (D').

The bases of polyaddition silicone composition can include exclusively linear POSs or else they may include all or some POSs which are cyclic and/or branched.

According to one variant, the POS A is selected from:

polydiorganosiloxanes bearing at least two condensable or hydrolysable groups RGa, located in the chain and/or at the chain end(s), each consisting of a group OR linked to the silicon, in which R is a hydrogen atom or a $C_1$–$C_6$ alkyl radical, and mixtures thereof;

whereas the crosslinking agent B is of the type POS B bearing RGb=H; A reacting with B by dehydrogenopolycondensation; and the molar ratio RGb:RGa being within the range from 0.4 to 10, preferably 1 to 5.

Examples of POSs A which can be crosslinked by dehydrogenopolycondensation are (dimethyl)polysiloxanes containing hydroxydimethylsilyl ends or containing alkoxydimethylsilyl or dialkoxymethylsilyl ends with alkoxy being methoxy, ethoxy or propoxy.

The POSs which can constitute the compounds A and B of the systems for crosslinking by dehydrogenopolycondensation can have, here also, a structure which is linear cyclic, and/or branched.

It should be understood that, in the context of the present invention, it is possible to use, as POS A or POS B, a mixture consisting of several polymers, having different viscosity values and/or having different substituents bonded to silicon atoms, and/or having different structure types (linear, cyclic, and/or branched).

As regards the effective amount of catalyst C relative to the other components A and B, this means a concentration of C which is necessary and sufficient to allow the crosslinking according to the kinetics required by the methodology according to the invention and to achieve the usage characteristics, expected in the applications targeted.

In the case of a silicone system which crosslinks by hydrosilylation, any standard hydrosilylation catalyst can be used in the process according to the invention. Preference is given in particular to platinum-based catalysts, especially Karstedt-type catalysts. Thus, the polyaddition catalyst C is preferably chosen from platinum and rhodium compounds. Complexes (Karstedt) of platinum and of an organic product described in U.S. Pat. Nos. 3,159,601, 3,159,602 and 3,220,972 and European patents Nos. EP 0,057,459, EP 0,188,978 and EP 0,190,530 can be used in particular, or alternatively complexes (Karstedt) of platinum and of vinyl organosiloxanes described in U.S. Pat. Nos. 3,419,593, 3,715,334, 3,377,432 and 3,814,730.

In order to give an idea, it can be pointed out that it is preferable for the amount or the concentration of C to be between 2 and 400 ppm of catalyst taken in the metallic state, preferably from 5 to 200 ppm and even more preferably from 10 to 150 ppm, relative to the amounts of constituents A and B used.

The catalysts C used in the type of crosslinking by dehydrogenopolycondensation are either platinum-based catalysts such as those mentioned above, or standard condensation catalysts composed of at least one metal belonging to the tin group, the latter metal being particularly preferred. It can be, for example, dibutyltin dilaurate.

When the catalyst C is platinum-based, it is used in the proportions indicated above, and when it is tin-based, its amount, expressed as ppm of tin metal relative to the amounts of compounds A and B, is between 1000 and 5000 and preferably between 2000 and 4000.

A, B and C are the base constituents of the silicone composition intrinsic to the process according to the invention. However, in reality, it is preferable to add other ingredients to them, by adopting the methodology variants consisting in preparing premixes of these additional ingredients with the constituents A, B and C.

Section (II)

Thus, in the context of the thin-layer coating of a travelling flexible support strip consisting, in particular, of paper, in order to give it anti-adhesive properties, it is advantageously possible to incorporate:

into at least one of the starting constituents A, B and C
and/or into the premix AB and/or AC and/or BC when this premix can be prepared,
or into the bath containing the constituents A, B and C,
→at least one crosslinking inhibitor D (this is particularly the case when silicone systems which crosslink by hydrosilylation are used),
→and/or at least one adhesion modifier E,
→and/or at least one other constituent F.

It should be understood that:
when the composition according to the process of the invention contains, along with the constituents A, B and C, the optional ingredients D and/or E and/or F, the DSC analysis and the procedure Pr mentioned above will then relate to the mixture consisting of A, B, C and of D and/or E and/or F.

According to a particular embodiment of the invention, intended for the formation of an anti-adhesive coating, provision is made such that step 1 breaks down as follows:

1'—premixing (step 0) of the constituents A, B+optionally D and/or E and/or F;

1"—followed by homogeneous mixing of the premix (e.g. AB, ABD, ABDE, ABDEF, ABE, ABF, ABDF, ABEF) with compound C.

According to a preferred embodiment of this particular embodiment of the invention intended for the formation of an anti-adhesive coating, at least one inhibitor D is necessarily incorporated into a system in which, on the one hand, the crosslinking between A and B takes place at least partly according to a hydrosilylation mechanism, and, on the other hand, there is a total absence of organic solvent such as, for example, the solvent in which it is possible to dissolve A and/or B in order to make up a solution which then represents the form in which A and/or B are used in the process.

As inhibitors D which can be used, the preferred inhibitors D are chosen from the group comprising: α-acetylenic alcohols, azodicarboxylates, maleic esters and mixtures thereof; 3,7,11-trimethyldodec-1-yn-3-ol (TMDDO) and ethynylcyclohexanol (ECH) are the preferred inhibitors.

As examples of hydrosilylation reaction inhibitors D which can be used, mention may be made of those described in French patent application No. 2,704,553 relating to long-chain α-acetylenic alcohols. The content of that patent application is moreover incorporated in its entirety into the present specification by reference.

As regards the azodicarboxylate-type inhibitors D, reference will be made to European patent application No. 0,184,965 which describes in detail such polyaddition crosslinking reaction inhibitors. The content of that patent application is, itself also, included in its entirety in the present application by reference. As examples of azodicarboxylate-type inhibitor compounds, mention may be made of ethyl azodicarboxylate.

As regards maleic ester type inhibitors D, reference will be made to French patent application No. 2,456,767 which describes such inhibitors in detail. The content of that patent application is, itself also, included in its entirety in the present application by reference. As examples of inhibitor compounds of this type, mention may be made of di-n-butyl maleate and diallyl maleate.

When (an) inhibitor(s) is (are) used, the concentration of this (these) inhibitor(s) is not more than 1% by weight, preferably not more than 0.5% by weight, and even more preferably is within the range from 0.01% to 0.5% by weight, relative to the amount of the constituents A and B.

As regards another optional compound of the silicone composition, i.e. the adhesion modifier E, this is preferably selected from the group of compounds formed by:

POS modifying resins containing an Si alkenyl function, which are described in French patent application No. 2,704,553 (resins referred to in this document as "Si alkenyl" MRs);

POS modifying resins containing an SiH function, which are described in French patent application No. 2,704,553 (resins referred to in this document as "SiH" MRs);

POS modifying resins containing an Si—OH function, consisting of at least two different types of siloxy unit "M" ($R_3SiO_{1/2}$), "Q" ($SiO_2$) and/or "T" ($RSiO_{3/2}$) and optionally "D" ($R_2SiO_{2/2}$), the organic radicals being identical or different and representing $C_1$–$C_{18}$ alkyl or cycloalkyl groups or phenyl groups, at least 80 mol % of the organic radicals representing a methyl group, the said resin containing at least 0.1 mol %, preferably from 0.5 to 5 mol %, of hydroxyl groups attached to the silicon with a ratio: number of units "M"/number of units "Q" and/or "T" of 0.6–1, the number of optional units "D" being 0.5–10 per 100 mol of resin;

mixtures of two or more than two of the abovementioned resins with each other;

mixtures of at least one of the abovementioned resins with the so-called "reactive" solvents which are described in French patent application No. 2,704,553 (it being recalled that the content of that patent application No. 2,704,553 is included in its entirety in the present application by reference).

As examples of resins forming part of the constitution of the adhesion modifier E, mention will be made of the resins:

$MD^{Vi}Q$ in which the vinyl groups are included in the units D, $MM^{Vi}Q$ in which the vinyl groups are included in some of the units M, MD'Q in which the hydrogen atoms linked to the silicon are included in the units D, MM'Q in which the hydrogen atoms linked to the silicon are included in some of the units M, MQ(OH) in which the hydroxyl groups linked to the silicon are included in the units M, the MQ resins comprising further $M^{Vi}$, $D^{Vi}$, M', D' and/or $M^{OH}$ units.

As already mentioned above, the mixture prepared in accordance with the process of the invention can advantageously comprise at least one other constituent F consisting:

(i) of an aliphatic and/or aromatic organic solvent which does not take part in the reaction, this solvent preferably being the one in which A and/or B are dissolved to make a solution which represents the form in which A and/or B are used in the process;

(ii) and/or of water in the case of using an emulsion system.

The presence of an additional additive of the organic solvent type, which does not participate in the reaction, preferably an aliphatic or aromatic solvent, should be placed in relation with the possibility which the invention offers of using starting constituents in solution form. The reason for this is that the POS resins A or B, or even the constituents C, D and E, can be supplied, metered, mixed and conveyed to the coating head in solution form.

According to an alternative, the constituents A, B, C, D and E can be used in emulsion form.

In accordance with an advantageous arrangement of the invention, provision is made such that the introduction of metered amounts of the constituents A, B and C, and optionally D and/or E and/or F, into the site(s) for premixing and/or into the site(s) for mixing C with the other constituents is carried out in a sequenced and repetitive manner.

Thus, when it relates, for example, in accordance with a preliminary step 1', to a premix of the compounds A, B and D, provision is made for the supply of the circuits with these 3 compounds to be carried out successively according to, for example, A/B/D or AD/A/B or AD/B/A, repeated throughout the continuous functioning of the process.

As has already been pointed out above, one of the key elements of the process of the invention, and this is particularly the case when this process is intended to provide an anti-adhesive coating, relates to the continuous metering of the constituents of the composition. In order to carry out this operation correctly, use is preferably made, for each constituent A, B and C, and optionally D and/or E and/or F of the composition, of metering means, in particular volumetric metering means, which are capable of ensuring the supply of a metered amount of each of these constituents as well as, at least partially, their circulation in a continuous flow, along the entire operating line.

As regards the mixing and premixing operations, static and/or dynamic mixing means are advantageously used.

Besides the main parameters of the process mentioned above, the inventors have selected other parameters which it would be prudent to take into account in order to ensure correct functioning of the process. Thus, advantageously, the parameters also to be considered for the premixing and/or mixing are:

the travelling speed of the support strip, the rate of consumption of the coating composition, the bath lifetime BLT, the flow rates for supply of the constituents A to F to the mixing or premixing sites, the flow rates at the mixer and premixer outlet, the speed of the flow of mixture and of premix, the duration separating the placing of C together with the constituents required for the reaction and the deposition of the homogeneous mixture on the support strip.

In the context of the use of the process of the invention intended for the formation of an anti-adhesive coating, in particular on paper, a device is used which comprises:

means, in particular volumetric means, for metering the constituents A, B, C, optionally D and/or E and/or F, means for premixing the constituents other than C, means for homogeneously mixing the constituents A, B, C, optionally D and/or E and/or F, at least one member for coating the travelling support strip, means for conveying the homogeneous mixture from the mixing site(s) (means) to the coating member, and means for conveying a premix from the premixing site(s) (means) to the mixing means, and means for activating the crosslinking of the coated support strip, these means preferably being thermal means consisting of at least one tunnel oven and/or irradiation means (UV radiation or an electron beam).

Advantageously, the premixing means comprise at least one upstream premixing chamber and downstream static premixing means, and the homogeneous mixing means comprise at least one upstream mixing chamber and downstream static mixing means.

Any system capable of coating in a thin layer can be used as coating member; mention will be made, for example, of the systems: "size press", air knife, Meyer bar, "direct etch" head, "multicylinder" head. Advantageously, the coating member consists of a "direct etch" head (or etched cylinder head) or of a "multicylinder" head, these members being widely used in the paper industry.

The structure and functioning of this device will be understood more clearly in the light of the description which follows, by way of non-limiting example, of a preferred embodiment of the said device.

The device is described with reference to the attached FIG. 1 which represents a synoptic scheme of the preferred embodiment of the device used to carry out the process of the invention intended for the formation of an anti-adhesive coating, in particular on paper.

This device comprises means 1 for volumetric metering of the constituents AD, A, B and C which are, respectively, a POS+inhibitor mixture, a POS, a crosslinking agent and a catalyst, for example a platinum or tin catalyst depending on whether the systems are of the polyaddition or dehydrogenopolycondensation type.

The device also includes means 2 for premixing the components other than C, means 3 for homogeneously mixing with the constituent C of the premix prepared, a coating member 4, means 5 for conveying the premix and the homogeneous mixture from the premixing and mixing sites, respectively, to the coating member 4, and means for heating the travelling support strip 7.

Metering means 1 are, for example, volumeters, i.e. geared mechanical components which allow precise measurement of a volume of product. Each volumeter 1 is placed, on the one hand, between each supply source of constituents AD, A and B, and the premixing means 2, and, on the other hand, between a supply source of constituent C and the homogeneous mixing means 3.

Each volumeter 1 behaves like a metering pump which takes the appropriate amount of constituent and injects it into the mixing circuit. An electrovalve 8 is fitted on the joint connecting each volumeter 1 to the premixing and mixing means 2 and 3, respectively.

The latter means comprise, respectively, an upstream premixing chamber 2.1 and a downstream mixing chamber 3.1, each connected, via a pipe 5 which forms the conveying means, to a downstream static premixing chamber 2.2 and to a downstream static mixing chamber 3.2, respectively.

The upstream chamber 2.1 and downstream chamber 2.2 allow premixing of the constituents AD, A and B, while the upstream chamber 3.1 and downstream chamber 3.2 allow homogeneous and intimate mixing of the premix ADAB with the catalyst C.

Each upstream chamber 2.1 and 3.1 is a member: (i) for static mixing which is known per se, consisting, for example, of a cylinder comprising coaxial toric channels, and (ii) for transit of the materials introduced. Each channel can be equipped with static blending blades. Such a member makes it possible to ensure the first placing in contact of the products.

The downstream chambers 2.2 and 3.2 are static mixers of a type which is known per se, consisting of a hollow cylinder fitted on the inside with mixing stators (blades) and through which the silicone composition ADAB or ADABC can pass while being homogeneously and intimately blended and mixed.

An electrovalve 8 is fitted on the pipe 5 between the downstream chamber 2.2 and the upstream chamber 3.1.

The static mixers used in this device are mounted in line in conveying means 5 (pipe) consisting, for example, of a flexible tube.

Advantageously, the coating member 4 is a "multicylinder" head consisting of two smooth cylinders 9.1 and 9.2 which define the coating head opposite which the end of the conveying means 5 emerges. The cylinders 9.1 and 9.2 are attached together and can be driven in rotation in opposite directions. The member 4 also comprises a relay cylinder 10 attached to the pair of cylinders 9.1 and 9.2 and provides the connection of this pair to a pair of cylinders 11.1 and 11.2, in the gap of which the support strip 7 travels in order possibly to be coated therein with crosslinking silicone composition ADABC. This coating member 4 is known per se.

According to a preferred characteristic of the invention, the end of the means 5 for conveying the intimate mixture are subdivided into two branches 12.1 and 12.2 which ensure a supply at two points of the metering cylinders 9.1 and 9.2, with the crosslinking intimate homogeneous mixture ADABC. Preferably, each of these two supply points is located close to one end of the injection head 9.1/9.2. According to variants, several injection points located along the entire length of the gap in the metering cylinders 9.1 and 9.2 may be envisaged.

The latter metering cylinders define a buffer tank of intimately and homogeneously mixed composition ADABC. By means of the cylinder 10 and the press 11.1/11.2, this composition is transferred and applied onto the support strip 7, which travels at a given speed in the direction indicated by the arrows on the drawing. This strip coated on one face then passes through the heating means 6 which are advantageously a tunnel oven, of the type known in the technical field considered.

The volumeters 1, the electrovalves 8, the coating member 4, the travelling strip 7 and the tunnel oven 6 can be controlled by a central control and computing unit which allows programming of the operating parameters of metering, of flow rate, of rate of consumption of the reactive bath and of crosslinking temperature, inter alia.

According to variant embodiments, other means for activating the crosslinking may be envisaged in addition to or in the place of the thermal crosslinking means 6, for example actinic radiation or an electron beam.

As a non-limiting example of continuous mixing and metering means which can be used in the device according to the invention, mention may be made of those described in French patent application No. 2,508,635 and in German Utility Model No. 296 06 710.

Section (III)

In the context of the coating of a travelling flexible support strip consisting of a textile material such as, in particular, a woven, knitted or non-woven fibrous support, in order to give it properties, in particular, of mechanical protection and/or strength, a silicone elastomer polyaddition composition is used, which advantageously incorporates:

- into at least one of the starting constituents A (which is, in this case, a POS equipped with ethylenically unsaturated reactive groups Rga), B and C,
- and/or into the premix AB and/or AC and/or BC when this premix can be prepared,
- or into the composition containing the constituents A, B and C,
- →at least one crosslinking inhibitor D,
- →at least one adhesion promoter G containing:
  G1: at least one alkoxylated organosilane containing, per molecule, at least one $C_2$–$C_6$ alkenyl group,
  G2: at least one organosilicon compound comprising at least one epoxy radical,
  G3: at least one chelate of a metal M and/or a metal alkoxide of general formula: $M(OJ)_n$, with n=valency of M and J=linear or branched $C_1$–$C_8$ alkyl, and M being chosen from the group formed by: Ti, Zr, Ge, Li, Mn, Fe, Al and Mg,
- →at least one constituent H whose function is to increase the mechanical strength of the silicone coating, this constituent being chosen from the group formed by: at least one unsaturated polyorganosiloxane resin H1, at least one inorganic reinforcing filler H2, at least one organic or inorganic hollow microspherical filler H3, or a mixture of 2 or more than 2 of these species with each other, and →optionally at least one other constituent I. It should be understood that:

when the composition according to the process of the invention contains, besides the constituents A, B and C, the complementary constituents D, G, H and optionally I, the DSC analysis and the procedure Pr, which have been referred to above, will then relate to the mixture consisting of A, B, C and of D, G, H and optionally I.

The silicone compositions defined in this section (III) of the context of the invention are intended for the coating or covering of woven, knitted or non-woven fibrous supports made of synthetic fibres, advantageously of polyester or polyamide fibres. These compositions are intended more particularly for coating or covering at least one of the faces of the flexible support material (such as, for example, a polyamide fabric) which is useful for the manufacture, by sewing, of inflatable bags for the personal protection of the occupants of vehicles, in the event of an impact (known as "airbags").

In this context, the process according to the invention proves to be remarkable not only for the coating of supports conventionally used in the manufacture of inflatable bags, but also for the coating, for this purpose, of supports with an open structure. The expression "support with an open structure" refers to supports with a porosity >15 l/dm$^2$/min according to DIN standard 53 887. In the case of a fabric, the open structure can be defined in particular as corresponding to a number of warp and weft threads per centimetre whose sum is less than or equal to 36.

As fabrics which are particularly recommended in the context of the present invention, mention will be made in general of fabrics whose weight in uncoated form is less than 200 g/m$^2$ and in particular less than or equal to 160 g/m$^2$. Mention may thus be made of such fabrics, in particular polyamide fabrics, having from 16×16 to 18×18 threads/cm, for example fabrics of 470 detex (decitex) having these characteristics.

It will be noted that it is also possible to use substrates, in particular fabrics, formed of technical textile fibres, i.e. of textile fibres whose properties are better than those of standard fibres, for example increased tenacity, in order to give specific or reinforced properties as a function of the applications of the coated support or fabric.

According to a first particular embodiment of the invention which is intended for coating a flexible support strip based on a textile material, arrangement is made such that step 1 breaks down as follows:

1a—premixing (step 0) of the constituents A (all or part), B, D, G1, G2, H (all or part)+optionally I (all or part);

1b—followed by homogeneous mixing of the premix (e.g. ABDG1G2H, ABDG1G2HI), with the constituents C, G3+optionally A (remaining part) and/or H (remaining part) and/or I (all or part).

According to a preferred embodiment of this first particular embodiment, provision is made such that step 1a breaks down as follows:

1a/1—prior premixing (1—1) of the constituents A (all or part) and H (all or part) or prior premixing (1-2) of the constituents G1, G2 and H (all or part), 1a/2—prior premixing (2-1) of the constituents B, D, G1, G2+optionally I (all or part) or prior premixing (2—2) of the constituents A (all or part), B, D+optionally I (all or part), 1a/3—followed by premixing either of the premixes (1—1)+(2-1) or of the premixes (1-2)+(2—2).

According to a second particular embodiment of the invention which is intended for coating flexible support strip based on textile material, arrangement is made such that step 1 breaks down as follows:

1'a—premixing of a ready-for-use mixture comprising constituents B+D+G1+G2+H+optionally I (all or part), with constituent A;

1'b—followed by homogeneous mixing of the premix (e.g. ABDG1G2H, ABDG1G2HI), with the constituents C, G3+optionally I (all or part).

According to a preferred embodiment of this second particular embodiment, provision is made such that step 1'a breaks down as follows:

1'a/1—prior premixing (premix 1'-1) of the ready-for-use mixture comprising B+D+G1+G2+H+optionally I (all or part), with a part of constituent A;

1'a/2 followed by premixing premix (1'-1) with remaining constituent A.

According to a third particular embodiment of the invention which is intended for coating flexible support strip based on textile material, arrangement is made such that step 1 breaks down as follows:

1"a—premixing of constituents A, C, G3+optionally I (all or part);

1"b—followed by homogeneous mixing of the premix with a ready-for-use mixture comprising constituents B+D+G1+G2+H+I (all or part).

According to a preferred embodiment of this third particular embodiment, provision is made such that step 1"a breaks down as follows:

1"a/1—prior premixing (premix 1"-1) constituent A (part), C, G3+optionally I (all or part);

1"a/2 followed by premixing premix (1"-1) with remaining constituent A.

In the context of preferred embodiments of the second and third particular embodiments, the constituent A of the prior premix, and the constituent A of the following premix, are usually POSs having different viscosities.

In accordance with a preferred arrangement of the invention, the alkoxylated organosilane G1 of the promoter G is particularly selected from the products of the following general formula:

$$R^1R^2C=C-U-Si{<}^{R^4_x}_{(OR^5)_{3-x}}$$
$$\phantom{R^1R^2C=}|$$
$$\phantom{R^1R^2C=}R^3$$

in which:

$R^1$, $R^2$ and $R^3$ are hydrogenated or hydrocarbon-based radicals, which may be identical to or different from each other, and preferably represent hydrogen, a linear or branched $C_1$–$C_4$ alkyl or a phenyl optionally substituted with at least one $C_1$–$C_3$ alkyl, U is a linear or branched $C_1$–$C_4$ alkylene or a divalent group of formula —CO—O-alkylene, in which the alkylene residue is a linear or branched $C_1$–$C_4$ alkyl and the right-hand free valency (on the fatty group) is linked to the Si, $R^4$ and $R^5$ are identical or different radicals and represent a linear or branched $C_1$–$C_4$ alkyl, X=0 to 2, preferably 0 or 1 and even more preferably 0.

Without this being limiting, it can be considered that vinyltrimethoxysilane (VTMO) and γ-methacryloxypropyltrimethoxysilane (MEMO) are particularly suitable compounds G1.

As regards the organosilicon compound G2, it is envisaged, according to the invention, to select it:
either from the products G2a corresponding to the following general formula:

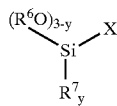 (G2a)

in which:
R⁶ is a linear or branched $C_1$–$C_4$ alkyl radical,
R⁷ is a linear or branched alkyl radical,
y is equal to 0, 1, 2 or 3, preferably to 0 or 1 and even more preferably to 0,

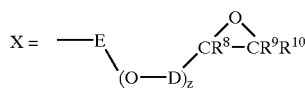

with
E and D, which are identical or different radicals chosen from linear or branched $C_1$–$C_4$ alkyls,
z which is equal to 0 or 1,
R⁸, R⁹ and R¹⁰ which are identical or different radicals representing hydrogen or a linear or branched $C_1$–$C_4$ alkyl, hydrogen being more particularly preferred,
R⁸, R⁹ or R¹⁰ which can alternatively constitute, together and with the two carbons bearing the epoxy, a 5- to 7-membered alkyl ring,
or from the products G2b consisting of epoxy functional polydiorganosiloxanes containing:
(i) at least one siloxyl unit of formula

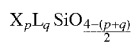 (G2b₁)

in which:
X is the radical as defined above for formula (G2a),
L is a monovalent hydrocarbon-based group, which has no unfavourable action on the activity of the catalyst, and which is preferably chosen from alkyl groups containing from 1 to 8 carbon atoms inclusive, optionally substituted with at least one halogen atom, advantageously, from methyl, ethyl, propyl and 3,3,3-trifluoropropyl groups, as well as from aryl groups and, advantageously, from xylyl, tolyl and phenyl radicals,
p=1 or 2,
q=0, 1 or 2,
p+q=1, 2 or 3,
and (ii) optionally at least one siloxyl unit of formula:

 (G2b₂)

in which L has the same meaning as above and r has a value of between 0 and 3, for example between 1 and 3.
The compounds G2 are preferably epoxyalkoxy-monosilanes G2a.
As examples of such compounds G2a, mention may be made of:
3-glycidoxypropyltrimethoxysilane (GLYMO), or
3,4-epoxycyclohexylethyltrimethoxysilane.

As regards the final essential compound G3 of the adhesion promoter G of the silicone composition of RTV or LSR type, the preferred products are those in which the metal M is chosen from the following list: Ti, Zr, Ge, Li, Mn. It should be pointed out that titanium is more particularly preferred. It can be combined, for example, with an alkoxy radical such as butoxy.
According to the invention, an advantageous combination for forming the adhesion promoter is as follows:
vinyltrimethoxysilane (VTMO)/3-glycidoxypropyltrimethoxysilane (GLYMO)/butyl titanate.
In quantitative terms, it can be pointed out that the weight proportions between $G_1$, G2 and G3, expressed as percentages by weight relative to the total weight of the three, are as follows:
G1≧10, preferably between 15 and 70 and even more preferably between 25 and 65,
G2≦90, preferably between 70 and 15 and even more preferably between 65 and 25,
G3≧1, preferably between 5 and 25 and even more preferably between 8 and 18,
it being understood that the sum of these proportions of G1, G2 and G3 is equal to 100%.
The weight ratio G2:G1 is preferably between 2:1 and 0.5:1, the ratio 1:1 being more particularly preferred.
Advantageously, the adhesion promoter is present in a proportion of from 0.1 to 10%, preferably 0.5 to 5% and even more preferably 1 to 3%, by weight relative to all of the constituents of the composition.
The silicone composition used also necessarily comprises at least one constituent H which can be at least one polyorganosiloxane resin H1 containing at least one alkenyl residue in its structure, and this resin has a weight content of alkenyl group(s) of between 0.1 and 20% by weight and preferably between 0.2 and 10% by weight.
These resins are branched organopolysiloxane oligomers or polymers which are well known and commercially available. They are in the form of solutions, preferably siloxane solutions. They contain, in their structure, at least two different units chosen from those of formula $R_3SiO_{1/2}$ (unit M), $R_2SiO_{2/2}$ (unit D), $RSiO_{3/2}$ (unit T) and $SiO_2$ (unit Q), at least one of these units being a unit T or Q.
The radicals R are identical or different and are chosen from linear or branched $C_1$–$C_6$ alkyl, $C_2$–$C_4$ alkenyl, phenyl and 3,3,3-trifluoropropyl radicals. Mention may be made, for example: as alkyl radicals R, of methyl, ethyl, isopropyl, tert-butyl and n-hexyl radicals, and, as alkenyl radicals R, of vinyl radicals.
It should be understood that, in the resins H1 of the abovementioned type, some of the radicals R are alkenyl radicals.
As examples of branched organopolysiloxane oligomers or polymers, mention many be made of the resins MQ, the resins MDQ, the resins TD and the resins MDT, it being possible for the alkenyl functions to be borne by the units M, D and/or T. As examples of resins which are particularly suitable, mention may be made of the vinyl MDQ resins with a weight content of vinyl group of between 0.2 and 10% by weight.
This compound H1 has the function of increasing the mechanical strength of the silicone elastomer coating, as well as its adhesion, in the context of coating the faces of a synthetic fabric (for example a polyamide fabric), sewn to form "airbags". This structural resin is advantageously present in a concentration of between 10 and 70% by weight relative to all of the constituents of the composition, without taking the microspheres into account, preferably between 30 and 60% by weight and even more preferably between 40 and 60% by weight.

The constituent H whose function is to increase the mechanical strength of the silicone coating can also be at least one reinforcing inorganic filler H2 and/or at least one microspherical filler H3. According to a preferred implementation characteristic, the abovementioned constituents H2 and H3 and the optional mixtures thereof are supplied, metered and mixed in the form of a dispersion or suspension in a fluid silicone material, which can advantageously consist of the constituent POS A, to which the constituent H1 is optionally added.

With regard to the inorganic filler H2, this can be a silica with a BET specific surface of at least 50 m$^2$/g. The fillers are advantageously treated by treating with the various organosilicon compounds usually used for this purpose. Thus, these organosilicon compounds can be organochlorosilanes, diorganocyclopolysiloxanes, hexaorganodisiloxanes, hexaorganodisilazanes or diorganocyclopolysilazanes (French patents FR-A-1,126,884, FR-A-1,136,885 and FR-A-1,236,505 and English patent GB-A-1,024,234).

The filler can also include a standard semi-reinforcing or packing filler, for example diatomaceous earth or ground quartz.

Other non-siliceous inorganic materials can be incorporated as semi-reinforcing or packing inorganic fillers: carbon black, titanium dioxide, aluminium oxide, hydrated alumina, expanded vermiculite, non-expanded vermiculite, calcium carbonate, zinc oxide, mica, talc, iron oxide, barium sulphate, slaked lime, etc.

These fillers may be present in a proportion of from 5 to 30%, preferably from 15 to 25%, for the reinforcing fillers, and from 5 to 40%, preferably from 10 to 30%, for the semi-reinforcing or packing fillers, relative to the total composition, excluding the microspheres.

In the case, in particular, of the use of a particulate, siliceous inorganic filler, the said filler can advantageously be used in the form of the suspension obtained by treating the filler by application of the method, in accordance with the teaching of French patent application No. 2,764,894, which involves a two-stage treatment of the filler with a compatibilizing agent (chosen, for example: as regards the first stage of the treatment, from a silazane, a hydroxysiloxane, an amine, an organic acid; and, as regards the second stage of the treatment, from a silazane), working in the presence of the constituent POS A. In the case in which such a treatment leads to a basic pH, a neutralizing agent such as, for example, a weak acid or a silica filler such as ground quartz can be added to the dispersion.

As regards the microsphere filler H3, this is preferably chosen from expandable organic microspheres containing a polymeric wall which contains a liquid or a gas. The expansion of these microspheres is brought about by heating them to beyond the softening point of the polymer and to a temperature which is sufficient to vaporize the liquid or to suitably dilate the gas, which can be, for example, an alkane such as isobutane or isopentane. The wall can consist of polymers or copolymers prepared, for example, from vinyl chloride, vinylidene chloride, acrylonitrile, methyl methacrylate or styrene monomers, or from mixtures of polymers and/or copolymers, for example, in particular, of acrylonitrile/methacrylonitrile copolymer or acrylonitrile/vinylidene chloride copolymer. See in particular U.S. Pat. No. 3,615,972 incorporated herein by way of reference.

These microspheres can be incorporated into the composition in expanded form, but it will be preferred to incorporate them before they have been expanded, it being possible for this expansion to be induced by suitable heating during the crosslinking of the elastomer.

It may be advantageous for the microspheres to be surface-treated, as is known per se, in order to promote their dispersion in the composition, in particular for expandable or expanded microspheres with an inorganic coating, for example silica or salts or hydroxides of metals such as Ca, Mg, Ba, Fe, Zn, Ni or Mn, as is described, for example, in EP-A-486,080, or alternatively carbonates, for example calcium carbonate.

Before they have been expanded, the microspheres will preferably have a diameter of between 3 and 50 $\mu$m, more particularly between 5 and 30 $\mu$m.

A diameter after expansion of between, in particular, 10 and 150 $\mu$m, in particular between 20 and 100 $\mu$m, will also be desired. In the case of inorganic microspheres or pre-expanded microspheres, the diameter will be of the same order.

These microspheres will be present in particular in a proportion of from 1 to 30% by weight, preferably from 2 to 10% and even more preferably 3 or 4%, by weight relative to the total composition.

In a manner which is known per se, the silicone elastomer polyaddition composition can have one or more additive(s) I added to it, such as, in particular:

I1: a so-called extending polyorganosiloxane, which consists, for example, of a (dimethyl)polysiloxane blocked at each of its chain ends with a $(CH_3)_2HSiO_{1/2}$ group, I2: at least one neutralizing agent consisting, for example, of a weak acid (e.g. acetic acid, phosphoric acid, optionally in solution in a polyorganosiloxane polymer), I3: one or more dye(s), I4: water in the case of using an emulsion silicone elastomer composition.

As regards the nature and proportions of the other constituents A, B, C and D, reference will be made to the elements presented below in paragraphs (I) and (II) of the description of the present invention.

It is noted that, in the case of the use of a constituent H containing all or part of at least one unsaturated resin H1, the proportions of POS A and B are such that the ratio of the number of hydrogen atoms linked to the silicon in POS B to the total number of groups containing alkenyl unsaturation in POS A and of the resin H1 is between 0.4 and 10, preferably between 1 and 5 and more preferably between 1.1 and 3.

According to an alternative, the constituents A, B, C, D, G1, G2, G3, H can be used in emulsion form.

In accordance with an advantageous arrangement of the invention, provision is made such that the introduction, in metered amounts, of the constituents A, B, C, D, G1, G2, G3, H and optionally I, into the premixing site(s) and/or into the site for mixing C and G3 with the other constituents, is carried out in a sequenced and repetitive manner.

Thus, supplying the premixing site(s) on the one hand, and the homogeneous mixing site on the other hand, may be carried out for example:

according to the first particular embodiment, with the repetitive sequences H/G1/G2/A/BD or HG1/G2/ABD or A/H/BD/G1/G2 or AH/BDG1G2, on the one hand, and on the other hand respectively HG1G2ABD/CG3 or AHBDG1G2/CG3;

according to the second particular embodiment, with the repetitive sequence BDG1G2HA(part)/A(remaining part) on the one hand, and, on the other hand BDG1G2HA/CG3; and according to the third particular embodiment, at the homogeneous mixing step, according to the repetitive sequence ACG3/DBG1G2H.

As has already been pointed out above, one of the key elements of the coating process relates to the continuous metering of the constituents of the composition. In order to carry out this operation correctly, use is preferably made, for constituents A, B, C, D, G1, G2, G3, H+optionally I of the composition, of metering means, in particular volumetric metering means, which are capable of ensuring the supply of a metered amount of each of these constituents as well as, at least partially, their circulation in a continuous flow, along the entire operating line. It is reminded that, according to section (III) of the present invention, constituents A, B, C, D, G1, G2, G3, H+optionally I may be separately used for preparing the composition, but some constituents may also be used separately while some other are gathered in a ready-for-use mixture, such as, for example, mixture B+D+ G1+G2+H+optionally I, or mixture A+D, or mixture B+D, or mixture A+C+G3.

As regards the mixing and premixing operations, static and/or dynamic mixing means are advantageously used.

Besides the main parameters of this process mentioned above, the inventors have selected other parameters which it would be prudent to take into account in order to ensure correct functioning of the process. Thus, advantageously, the parameters also to be considered for the premixing and mixing are:

the travelling speed of the support strip, the rate of consumption of the coating composition, the bath lifetime BLT, the flow rates for supply of the constituents to the mixing and premixing sites, the flow rates at the mixer and premixer outlet, the speed of the flow of mixture and of premixe(s), the duration separating the placing of C and G3 together with the constituents required for the reaction and the deposition of the mixture on the support strip.

Section (Iv)

According to another of its objects, the present invention proposes, in a second subject, a device which can be used in particular for carrying out the process for the coating of a flexible support strip based on a textile material, using a silicone elastomer polyaddition composition.

This device is characterized in that it comprises:

means, in particular volumetric means, for metering the constituents A, B, C, D, G1, G2, G3, H and optionally I, means for premixing the constituents other than C and G3, it being possible for the said premix itself to be derived from the mixing either of two premixes each prepared beforehand from two or more than two of the constituents concerned, or of a prior premix prepared from at least two concerned constituents, and a single constituent, means for homogeneously mixing the constituents A, B, C, D, G1, G2, G3, H and optionally I, at least one member for coating the travelling support strip, means for conveying the homogeneous mixture from the homogeneous mixing site (means) to the coating member, and means for conveying from the premixing site(s) (means) to the homogeneous mixing site (means), and means for activating the crosslinking of the coated support strip, these means preferably being thermal means consisting of at least one tunnel oven and/or irradiation means (UV radiation or an electron beam).

Advantageously, the premixing means comprise at least one upstream premixing chamber and one downstream static premixing chamber, and the homogeneous mixing means comprise at least one upstream mixing chamber and one downstream static mixing chamber.

Any suitable coating system can be used as coating member; advantageously, the coating is carried out using a scraper, and in particular a roll scraper, an air scraper or a carpet scraper.

The structure and functioning of this device will be understood more clearly in the light of the description which follows, given by way of non-limiting example, of a preferred embodiment of the said device.

Figure 2:
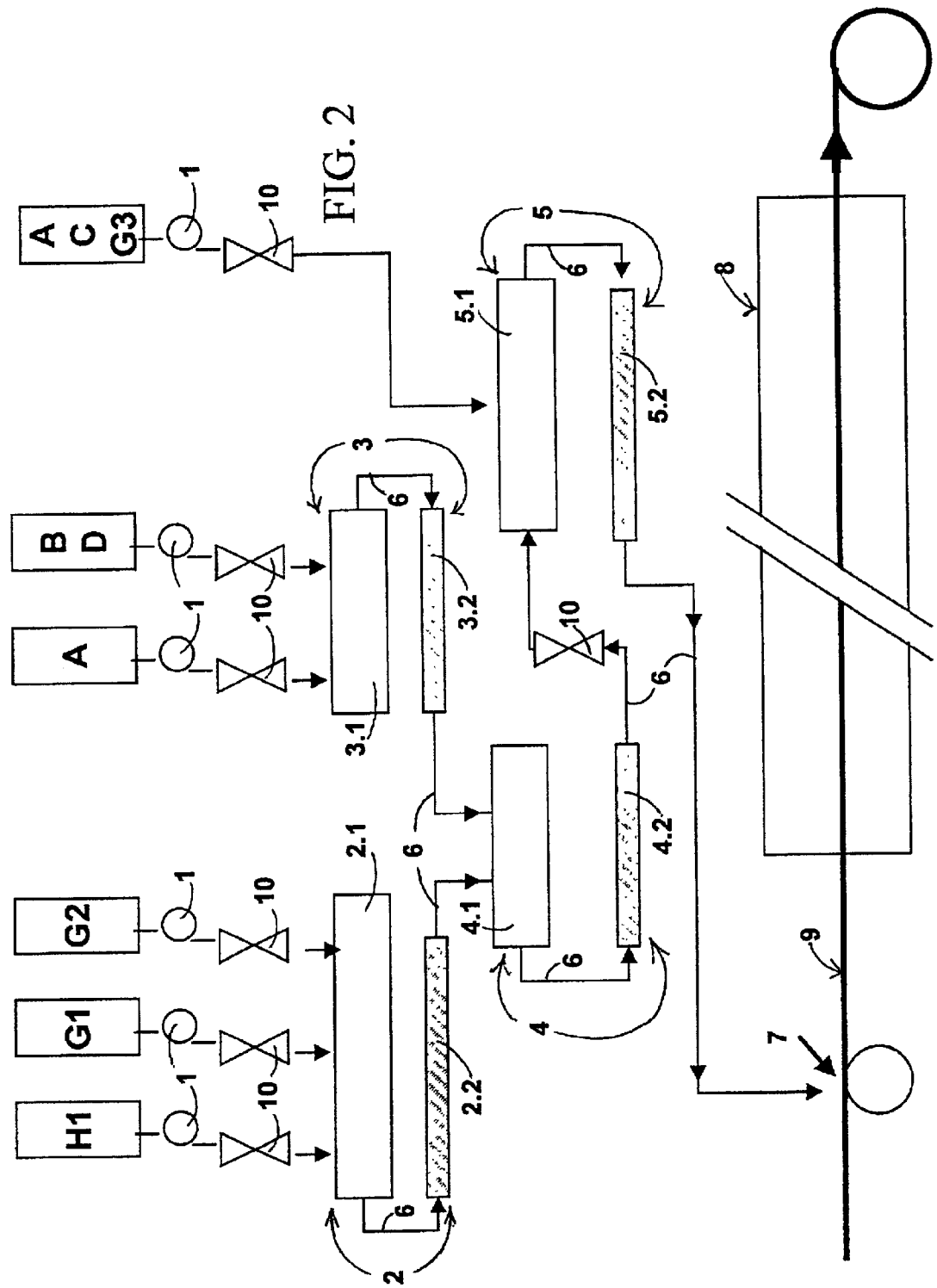
FIG. 2 is a drawing of the preferred embodiment of a device useful in the process of the present invention.

The device is described with reference to the attached FIG. 2 which represents a synoptic scheme of the preferred embodiment of the device used to carry out the process of the invention intended for coating a textile material, according to the first particular embodiment of the invention, described above.

This device comprises means 1 for volumetric metering of the constituents: H1, G1, G2, A (in part), mixture B+D, and mixture A (remaining part)+C+G3, these various constituents having the meanings given above at the start of paragraph (III) of the description of the present invention.

The device also includes:

means or a site 2 for premixing the constituents H1, G1 and G2 to form the premix PM1 (e.g. HG1G2), means or a site 3 for premixing the constituents A (in part) and the mixture B+D to form the premix PM2 (e.g. ABD), means or a site 4 for premixing the premixes PM1 and PM2 to form the premix PM3 (e.g. HG1G2ABD), means or a site 5 for homogeneously mixing the premix PM3 with the mixture A (remaining part)+C+G3, means 6 for conveying:

the premixes PM1 and PM2 from the premixing sites 2 and 3 to the premixing site 4, the premix PM3 from the premixing site 4 to the homogeneous mixing site 5, the homogeneous mixture from the homogeneous mixing site 5 to the coating member 7, means 8 for heating the travelling support strip 9.

Metering means 1 are, for example, volumeters, i.e. geared mechanical components which allow precise measurement of a volume of product. Each volumeter 1 is placed between:

a source for supplying the constituents H1, G1, G2, A, mixture B+D, and mixture A+C+G3, and the premixing site 2 (as regards the constituents H1, G1 and G2), the premixing site 3 (as regards the constituents A, B+D) and the mixing site 5 (as regards the mixture A+C+G3).

Each volumeter 1 behaves like a metering pump which takes the appropriate amount of compounds and injects it into the mixing circuit. An electrovalve 10 is fitted on the joint connecting each volumeter 1 to the premixing and mixing sites 2, 3 and 5.

Each premixing site (or means) 2, 3 or 4 comprises an upstream premixing chamber, 2.1, 3.1 or 4.1 respectively, connected, via a pipe 6 which forms the conveying means, to a downstream static premixing chamber, 2.2, 3.2 or 4.2 respectively. Similarly, the homogeneous mixing site (or means) 5 comprises an upstream mixing chamber 5.1 connected, via a pipe 6, to a downstream static mixing chamber 5.2.

The upstream chamber 2.1 and downstream chamber 2.2 allow premixing of the constituents H, G1 and G2. The upstream chamber 3.1 and downstream chamber 3.2 allow premixing of the constituents A, B and D. The upstream chamber 4.1 and downstream chamber 4.2 allow premixing of the premixes HG1G2 and ABD. The upstream chamber 5.1 and downstream chamber 5.2 allow homogeneous and intimate mixing of the premix HG1G2ABD with the mixture A+C+G3.

Each upstream chamber is a member: (i) of a static mixer which is known per se, consisting, for example, of a cylinder comprising coaxial toric channels, and (ii) for transit of the materials introduced. Each channel can be equipped with static blending blades. Such a member makes it possible to ensure the first placing in contact of the products.

The downstream chambers are static mixers of a type which is known per se, consisting of a hollow cylinder fitted on the inside with mixing stators (blades) and through which the silicone composition can pass while being homogeneously and intimately blended and mixed.

An electrovalve 10 is fitted on the pipe 6 between the downstream chamber 4.2 and the upstream chamber 5.1.

The static mixers used in this device are mounted in line in conveying means 6 (pipe) consisting, for example, of a flexible tube.

Advantageously, the coating member 7 consists of an air scraper, opposite which emerges the end of the conveying means 6. It can be designed to actuate the coating member so as to define a buffer tank of intimately and homogeneously mixed composition. By means of this member 7, the silicone composition is transferred and applied onto the support strip 9 which is travelling at a given speed in the direction indicated by the arrows on the drawing.

This strip coated on one face then passes through the heating means 8 which are advantageously a tunnel oven, of the type known in the technical field considered.

The volumeters 1, the electrovalves 10, the coating member 7, the travelling strip 9 and the tunnel oven 8 can be controlled by a central control and computing unit which allows programming of the operating parameters of metering, of flow rate, of rate of consumption of the reactive bath, and of crosslinking temperature, inter alia.

As non-limiting examples of continuous mixing and metering means which can be used in the device according to the invention, mention may be made of those described in French patent application No. 2,508,635 and in German Utility Model No. 296 06 710.

EXAMPLES

Example 1
Example of Continuous Coating of an Anti-Adhesive Silicone Composition
1.1. Equipment and Starting Materials The device used is the one represented in FIG. 1 and described above. More specifically, use is made in this example of a continuous mixing and metering machine such as Volumix® sold by the company DOPAG.

The coating member consists of a five-cylinder coating head.

The tunnel oven has the following characteristics: blowing of hot air via a nozzle onto the coated face in 3 zones each 2 meters in length, with a flow rate of air of 1800 m$^3$ per hour and per zone.

The constituents AD, A, B and C used are as follows:

mixture A+D: the POS A is an oil consisting of a polydimethylsiloxane containing dimethylvinylsilyl ends, containing 0.014 SiVi function per 100 g of oil (Vi= vinyl); the inhibitor D is ethynylcyclohexanol; the mixture contains 0.3% by weight of inhibitor;

constituent A: this is the vinyl POS oil used to prepare the mixture A+D;

constituent B: this is a poly(dimethyl)(hydrogenomethyl) siloxane oil containing trimethylsilyl ends, containing 1.05 SiH functions per 100 g of oil;

constituent C: Karstedt-type platinum catalyst consisting of a solution containing 3000 ppm of platinum metal in a polydimethylsiloxane oil containing dimethylvinylsilyl ends; the said solution contains 0.041 SiVi function per 100 g.

The device thus comprises 4 sources for supplying the constituents of the composition, namely: mixture AD, POS A, POS B and catalyst C.

1.2. Calibration of the Volumeters:

The volumeters 1 assigned to the sources for supplying AD, B and A, on the one hand, and catalyst C, on the other hand, are adjusted such that the proportions used are as follows:

(AD+B+A): C→100 parts by weight: 3 parts by weight; i.e. 90.2 ppm of Pt relative to A+B.

In the same way, the volumeters 1 corresponding to AD, B and A are adjusted such that the proportions between these constituents are as follows:

AD: A→90 parts by weight:10 parts by weight, (AD+A): B→100 parts by weight:1.8 parts by weight.

With these proportions: the SiH:SiVinyl molar ratio is equal 1.25; the amount of inhibitor D is equal to 0.27% relative to the total mass of A+B.

It is also found that the BLT of the mixture is 20 hours at 30° C.

1.3. Other Parameters

The following parameters are also established as indicated below:

Flow rate at mixer outlet: 31 g/min;

Capacity of the coating member buffer tank: 200 g;

Rate of consumption of the crosslinking composition: 2 kg/hour;

Strip travelling speed: 100 meters/min;

Temperature gradient in the tunnel oven: 1st zone: 180° C., 2nd zone: 180° C. and 3rd zone: 180° C.

1.4. Functioning

The device is switched on and the cylinder coating head 5 is continuously supplied for 4 hours with the mixture of products AD, A, B and C. The paper coated using this coating member is a glassine-type paper. The deposition is carried out at a rate of 1 g/m$^2$. It is crosslinked in line by passing through a tunnel oven, at a temperature of about 180° C., the travelling speed being 100 m/min.

This continuous functioning was carried out without any notable problems. In particular no gelation took place. The quality of the anti-adhesive coating obtained is entirely satisfactory and the quality of the attachment of the deposit to the support is excellent.

The supply of compounds AD, A and B is ensured by the volumeters and/or by a pump, for example a pneumatic pump and/or by pressurizing the reservoirs which constitute the supply sources of the various constituents.

The control of the opening of the electrovalves 8 is programmed such that the premixing means 2 and mixing means 3 are supplied in repeating sequences AD/A/B, on the one hand, and ADAB/C, on the other hand, respectively.

The programming of the control unit obviously integrates the variables or the parameters for controlling the volumeters and the electrovalves.

1.5. Evaluation of the Process

Characterization of the homogeneous mixture obtained from the constituents AD, A, B and C is carried out by differential thermal analysis DSC using a TA 4000 Metler machine: this analysis gives access to the following values given by the machine:

peak start temperature T1: 94° C., peak summit temperature T2: 111° C., peak end temperature T3: 126° C., $\Delta T=T3-T1$: 32° C.

The following are also found:

$\Delta Tref=33°$ C.

$\Delta T=\Delta Tref-1°$ C.

Every 30 minutes, a sample of the bath is taken from the coating head to measure its viscosity; a sample of coated paper is also taken and placed in contact with a TESA® 4970 adhesive strip (acrylic type) and the adhesion force (or delamination force) is measured according to FINAT test No. 10 using an Instron® dynamometer with a delamination speed of 0.3 m/min.

The results of the measurements are given in the following table:

| Time (hours) | Viscosity mPa · s | Adhesion force CN/inch |
|---|---|---|
| 0 | 365 | 17.2 |
| 0.5 | 352 | 17.5 |
| 1 | 357 | 18.3 |
| 1.5 | 363 | 17.9 |
| 2 | 367 | 16.8 |
| 2.5 | 360 | 18.0 |
| 3 | 355 | 17.9 |
| 3.5 | 352 | 17.5 |
| 4 | 361 | 18.3 |
| Average | 359 | 17.7 |
| Standard deviation | 5.46 | 0.5 |

These results show in particular the uniformity, on the one hand, of the viscosity of the bath, and, on the other hand, of its anti-adhesive properties.

Example 2

Example of Continuous Coating of a Silicone Composition of RTV Type onto a Polyamide Fabric 1.1. Equipment and Starting Materials The device used is the one represented in FIG. 2 and described above. More specifically, use is made in this example of a continuous mixing and metering machine such as Volumix® sold by the company DOPAG.

The coating member consists of a coating head with an air scraper.

The thermal crosslinking is ensured by means of a tunnel oven blowing hot air, the operating parameters of which are described below.

The constituents H1, G1, G2, A, B+D, and A+C+G3 are as follows:

constituents H1: unsaturated polyorganosiloxane resin of structure $MM^{Vi}DD^{Vi}Q$ containing 0.9% by weight of vinyl (Vi) groups and consisting of 21% by weight of $(CH_3)_3SiO_{1/2}$ units, 0.2% by weight of $(CH_3)_2ViSiO_{1/2}$ units, 67.8% by weight of $(CH_3)_2SiO_{2/2}$ units, 3% by weight of $CH_3ViSiO_{2/2}$ units and 8% by weight of $SiO_2$ units;

constituent G1: vinyltrimethoxysilane (VTMO);

constituent G2: 3-glycidoxypropyltrimethoxysilane (GLYMO);

constituent A: polydimethylsiloxane oil containing dimethylvinylsilyl ends, with a viscosity of 10,000 mPa.s and containing 0.005 SiVi function per 100 g of oil;

mixture B+D: the POS B is an oil consisting of a poly(dimethyl)(hydrogenomethyl)siloxane copolymer containing dimethylhydrogenosilyl ends, with a viscosity of 25 mPa.s and containing 0.7 SiH function per 100 g of oil; the inhibitor D is ethynylcyclohexanol; the mixture contains 0.3% by weight of inhibitor;

mixture A+C+G3: its composition is as follows:
POS A: 95.4 parts by weight of the vinyl POS oil defined above,
catalyst C: 0.0215 part by weight of platinum metal in the form of a metal complex known as a Karstedt catalyst,
adhesion promoter G3: 4 parts by weight of butyl orthotitanate.

The device thus comprises 6 sources for supplying the constituents of the composition, namely: H1, G1, G2, POS A, mixture POS B+D, and mixture POS A+C+G3.

1.2. Calibration of the Volumeters:

The volumeters 1 assigned to the sources for supplying H1, G1, G2, A and BD, on the one hand, and ACG3, on the other hand, are adjusted such that the proportions used are as follows:

(H1+G1+G2+A+BD): (ACG3)→100 parts by weight:10 parts by weight; i.e. 28 ppm of platinum relative to A+B.

In the same way, the volumeters 1 corresponding to H1, G1, G2, A and BD are adjusted such that the proportions between these constituents are as follows:

H1:G1:G2→30 parts by weight: 1 part by weight: 1 part by weight,

A:BD→63 parts by weight: 5 parts by weight, (H1+G1+G2):(A+BD)→32 parts by weight: 68 parts by weight.

With these proportions: the SiH:Si vinyl molar ratio is equal to 1.78; the amount of resin H1 is equal to 27.3% relative to the mass of the composition; the amount of inhibitor D is equal to 0.019% relative to the total mass of A+B; the amount of promoter (G1+G2+G3) is equal to 2.2% relative to the mass of the composition.

It is also found that the BLT of the mixture is 6 hours at 30° C.

1.3. Other Parameters

The following parameters are also established as indicated below:

| | |
|---|---|
| Viscosity of the crosslinking composition | 20,000 mPa · s; |
| Flow rate at mixer outlet | 780 g.min-1; |
| Capacity of the coating member buffer tank | 3.2 kg; |
| Rate of consumption of the cross-linking composition | 47 kg/h; |
| Textile support travelling speed | 6 m/min; |
| Number of zones in the tunnel oven | 3; |
| Flow rate of hot air in the oven for each zone | 2000 m3/h; |
| Temperature of first oven zone | 140° C.; |

-continued

| | |
|---|---|
| Temperature of second oven zone | 175° C.; |
| Temperature of third oven zone | 175° C. |

1.4. Functioning

The device is switched on and the air-scraper coating head is continuously supplied for almost three hours with the mixture of products H1, G1, G2, A, BD and ACG3. The fabric coated with this crosslinking composition is a delaminated polyamide of 6,6 type (polyhexamethyleneadipamide) of 470 dtex with 18×18 threads/cm. The deposition produced is 130 g/m². It is crosslinked in line by passing through a tunnel oven, at a temperature of about 175° C. and a textile support travelling speed of 6 m/min.

The continuous functioning was carried out without any notable problems. The quality of the coating obtained is in accordance with the standard specifications sheet for the technical textile coating targeted, for an equivalent weight deposited and an equivalent fabric. Several types of coloration were tested successfully.

The supply of the constituents H1, G1, G2, A, BD and ACG3 is ensured by volumeters and/or by a pump, for example a pneumatic pump, and/or by pressurizing the reservoirs which constitute the supply sources of the various constituents.

The control of the functioning of the volumeters 1 and of the opening of the electrovalves 10 is programmed such that the premixing sites 4 and mixing sites 5 are supplied in repeating sequences H1G1G2/ABD, on the one hand, and H1G1G2ABD/ACG3, on the other hand.

1.5. Evaluation of the Process:

Characterization of the homogeneous mixture obtained from the constituents H1, G1, G2, A, B+D and A+C+G3 is carried out by differential thermal analysis DSC using a TA 4000 Metler machine: this analysis gives access to the following values given by the machine:

| | |
|---|---|
| peak start temperature T1: | 57° C.; |
| peak summit temperature T2: | 99° C.; |
| peak end temperature T3: | 132° C.; |
| $\Delta T = T3 - T1$: 75° C.; | |
| $\Delta T$ ref = 70° C.; | |
| $\Delta T = \Delta T$ ref + 5° C. | |

Several tests with addition of an inlet for a colouring base, both downstream and upstream of the homogeneous mixing site, were carried out and allowed the colour of the coating to be modified, while retaining an equivalent level of performance.

The quality of the mixture obtained is assessed visually. The performance given to the textile support by the silicone coating is in accordance with the standard specifications sheet for the technical fabrics.

What is claimed is:

1. A process for the continuous coating of a traveling support strip of a textile material, the coating being a silicone elastomer composition comprising:

i) at least one polyorganosiloxane A having ethylenically unsaturated reactive groups;
   ii) at least one crosslinking agent B;
   iii) an effective amount of a catalyst C;
   iv) at least one crosslinking inhibitor D;
   v) an adhesion promoter G comprising the following:
      an alkoxylated organosilane G1 having, per molecule, at least one C2–C6 alkenyl group;
      an organosilane compound G2 comprising at least one epoxy radical; and
      a chelate G3 of a metal M and/or a metal alkoxide of the general formula M(OJ)n wherein n is the valency of M and J is a linear or branched C1–C8 alkyl and M is selected from the group consisting of Ti, Zr, Ge, Li, Mn, Fe, Al and Mg;
   vi) a constituent H that increases the mechanical strength of the coating;

the process comprising:
   1'a) continuously preparing in a premixing means a premix of constituent A and a ready-for-use mixture comprising constituents B, D, G1, G2, and H,
   1'b) continuously preparing in a mixing means a homogenous mixture of the premix and constituents C and G3, the homogeneous mixture being prepared under the following conditions:
      aa) a bath lifetime (BLT) at 30° C. of from 1 to 24 hours;
      bb) a differential scanning calorimetry DSC signature having at least one Gaussian peak showing:
         aaa) a peak start temperature T1:
         bbb) a peak summit temperature T2; and
         ccc) a peak end temperature T3;
      the Gaussian peak having the following:
         aaaa) T3 from 110° C. to 200° C.
         bbbb) $\Delta T = T3 - T1$ of from 20° C. to 100° C.;
         cccc) T1<100° C.; and
         dddd) $\Delta T = \Delta T$ref±10° C.
   wherein $\Delta T$ref=$\Delta T3$,ref–$\Delta T1$,ref is obtained from the DSC signature peak of a reference ABCDGH mixture, the homogeneous mixture being prepared at a flow rate corresponding to the rate of consumption of the homogenous mixture at a coating member and the constitution of a buffer reserve;
   1'c) conveying the homogenous mixture from the mixing means to the coating means;
   1'd) coating the traveling support strip with the homogenous mixture from the coating means;
   1'e) allowing the crosslinking to occur.

2. A process according to claim 1, wherein the silicone elastomer composition further comprises at least one other constituent I selected from the group consisting of:
   I1: an extending polyorganosiloxane,
   I2: a neutralizing agent
   I3: one or more dye(s), and
   I4: water,
   all or a part of constituent I is comprised in the ready-for-use mixture of step 1'a, or all or a part of constituent I is homogeneous mixed in step 1'd, and $\Delta T$ref=$\Delta T3$,ref–$\Delta T1$,ref is obtained from the DSC signature peak of a reference ABCDGHI mixture, the homogeneous mixture being prepared at a flow rate corresponding to the rate of consumption of the homogenous mixture at a coating member and the constitution of a buffer reserve.

3. A process according to claim 1, wherein the constituent H is selected from at least one of the following:
   an unsaturated polyorganosiloxane resin H1;
   an inorganic reinforcing filler H2; and
   an organic or inorganic hollow microspherical filler H3.

4. A process according to claim 1, wherein the traveling flexible support is a woven, knitted or non-woven fibrous support.

5. A process according to claim 1, wherein metered amounts of constituent A and the ready-for-use mixture comprising constituents B, D, G1, G2, and H are introduced into the premixing means and the homogenous mixture of the premix and the constituents C and G3 into the mixing means, in a sequenced and repetitive manner.

6. A process according to claim 1, wherein, for each of constituent A and the ready-for-use mixture comprising constituents B, D, G1, G2, and H, volumetric metering means are used to ensure the supply of metered amounts of each of these constituents.

7. A process according to claim 1, wherein the polyorganosiloxane A has, per molecule, at least two groups RGa, located in the chain or at the chain end(s), each having a C2–C10 alkenyl group linked to the silicon, wherein the crosslinking agent B is a polyorganosiloxane having, per molecule, at least two groups RGb, each being a Hydrogen atom linked to the silicon, located in the chain or at the chain end(s), and wherein A reacts with B by hydrosilylation, with the proviso that the molar ratio RGa:RGb is between 0.4 to 10.

8. A process for the continuous coating of a traveling support strip of a textile material, the coating being a silicone elastomer composition comprising:

i) at least one polyorganosiloxane A having ethylenically unsaturated reactive groups;

ii) at least one crosslinking agent B;

iii) an effective amount of a catalyst C;

iv) at least one crosslinking inhibitor D;

v) an adhesion promoter G comprising the following:

an alkoxylated organosilane G1 having, per molecule, at least one C2–C6 alkenyl group;

an organosilane compound G2 comprising at least one epoxy radical; and a chelate G3 of a metal M and/or a metal alkoxide of the general formula M(OJ)n wherein n is the valency of M and J is a linear or branched C1–C8 alkyl and M is selected from the group consisting of Ti, Zr, Ge, Li, Mn, Fe, Al and Mg;

vi) a constituent H that increases the mechanical strength of the coating;

the process comprising:

1"a) continuously preparing in a premixing means a premix of constituents A, C, and G3, 1"b) continuously preparing in a mixing means a homogenous mixture of the premix and a ready-for-use mixture comprising constituents B, D, G1, G2, and H, the homogeneous mixture being prepared under the following conditions:

aa) a bath lifetime (BLT) at 30° C. of from 1 to 24 hours;

bb) a differential scanning calorimetry DSC signature having at least one Gaussian peak showing:

aaa) a peak start temperature T1:

bbb) a peak summit temperature T2; and ccc) a peak end temperature T3;

the Gaussian peak having the following:

aaaa) T3 from 110° C. to 200° C.

bbbb) ΔT=T3−T1 of from 200° C. to 100° C.;

cccc) T1<100° C.; and dddd) ΔT=ΔTref±10° C.

wherein ΔTref=ΔT3,ref−ΔT1,ref is obtained from the DSC signature peak of a reference ABCDGH mixture, the homogeneous mixture being prepared at a flow rate corresponding to the rate of consumption of the homogenous mixture at a coating member and the constitution of a buffer reserve;

1"c) conveying the homogenous mixture from the mixing means to the coating means;

1"d) coating the traveling support strip with the homogenous mixture from the coating means;

allowing the crosslinking to occur.

9. A process according to claim 8, wherein the silicone elastomer composition further comprises at least one other constituent I selected from the group consisting of:

I1: an extending polyorganosiloxane,

I2: a neutralizing agent

I3: one or more dye(s), and

I4: water, all or a part of constituent I is premixed in step 1"a, or all or a part of constituent I is comprised in the ready-for-use mixture of step 1"b, and ΔTref=ΔT3,ref−ΔT1,ref is obtained from the DSC signature peak of a reference ABCDGHI mixture, the homogeneous mixture being prepared at a flow rate corresponding to the rate of consumption of the homogenous mixture at a coating member and the constitution of a buffer reserve.

10. A process according to claim 8, wherein the constituent H is selected from at least one of the following:

an unsaturated polyorganosiloxane resin H1;

an inorganic reinforcing filler H2; and an organic or inorganic hollow microspherical filler H3.

11. A process according to claim 8, wherein the traveling flexible support is a woven, knitted or non-woven fibrous support.

12. A process according to claim 8, wherein metered amounts of constituent A and the ready-for-use mixture comprising constituents B, D, G1, G2, and H are introduced into the premixing means and the homogenous mixture of the premix and the constituents C and G3 into the mixing means, in a sequenced and repetitive manner.

13. A process according to claim 8, wherein, for each of constituent A and the ready-for-use mixture comprising constituents B, D, G1, G2, and H, volumetric metering means are used to ensure the supply of metered amounts of each of these constituents.

14. A process according to claim 8, wherein the polyorganosiloxane A has, per molecule, at least two groups RGa, located in the chain or at the chain end(s), each having a C2–C10 alkenyl group linked to the silicon, wherein the crosslinking agent B is a polyorganosiloxane having, per molecule, at least two groups RGb, each being a Hydrogen atom linked to the silicon, located in the chain or at the chain end(s), and wherein A reacts with B by hydrosilylation, with the proviso that the molar ratio RGa:RGb is between 0.4 to 10.

\* \* \* \* \*